(12) United States Patent
Fishkin (10) Patent No.: US 6,460,074 B1
(45) Date of Patent: *Oct. 1, 2002

(54) ELECTRONIC MAIL SYSTEM

(76) Inventor: Martin E. Fishkin, 49 Ackers Dr., Brookline, MA (US) 02445

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/501,237

(22) Filed: Feb. 10, 2000

(51) Int. Cl.⁷ .............................................. C06F 17/20
(52) U.S. Cl. ...................................... 709/206; 707/532
(58) Field of Search .................. 707/10, 532; 709/206, 709/207, 217, 219, 229; 713/152

(56) References Cited

U.S. PATENT DOCUMENTS

| | | | |
|---|---|---|---|
| 5,279,869 A | | 1/1994 | Forrest et al. ............... 709/206 |
| 5,283,856 A | | 2/1994 | Gross et al. .................. 706/47 |
| 5,283,887 A | | 2/1994 | Zachery ...................... 707/513 |
| 5,493,692 A | | 2/1996 | Theirmer et al. ........... 455/26.1 |
| 5,555,426 A | | 9/1996 | Johnson ...................... 709/206 |
| 5,619,648 A | | 4/1997 | Canale et al. ............... 709/206 |
| 5,796,948 A | | 8/1998 | Cohen ......................... 709/206 |
| 5,809,232 A | | 9/1998 | Johnson et al. ............. 709/206 |
| 5,870,548 A | | 2/1999 | Nielsen ....................... 709/206 |
| 5,884,033 A | | 3/1999 | Duvall et al. ............... 709/206 |
| 5,999,932 A | * | 12/1999 | Paul ............................. 707/10 |
| 6,065,056 A | * | 5/2000 | Bradshaw et al. .......... 709/229 |
| 6,073,133 A | * | 6/2000 | Chrakaszez .................. 707/10 |
| 6,108,688 A | * | 8/2000 | Nielsen ....................... 709/206 |
| 6,161,130 A | * | 12/2000 | Horvitz et al. .............. 709/206 |
| 6,199,106 B1 | * | 3/2001 | Shaw et al. ................. 709/217 |
| 6,205,472 B1 | * | 3/2001 | Gilmour ...................... 709/206 |
| 6,212,553 B1 | * | 4/2001 | Lee et al. .................... 709/206 |
| 6,219,786 B1 | * | 4/2001 | Cunningham et al. ...... 713/152 |
| 2002/0013692 A1 | * | 1/2002 | Chandhok et al. ............. 704/1 |

OTHER PUBLICATIONS

"Eudora 5.0 Moodwatch," help file page downloaded Sep. 25, 2000.
"Flaming: A White Paper," David Kaufer, Department of English, Carnegie Mellon, Jun. 2000.
"QUALCOMM's Eudora 5.0 Spices up the Email Experience with Hot, New Time–saving Tools to Keep People Connected," press release downloaded Sep. 25, 2000.
"Telecommunications Methods" by McClellan et al. Wiley Encyclopedia of Electrical and Electronic Engineering Online, Dec. 27, 1999.*
"Microsoft Outlook 98 Training Guide and User's Manuel," PTS Learning Systems. pp. 194–195.
"Microsoft Outlook 98", spell check cancellation prompting screen shots. pp. 1–2. Version 8.5.6204.0, 1998.
"Microsoft Outlook 98" help file screen shot. check recipient names before sending a message. Version 8.5.6204.0, 1998.
"Mastering Microsoft Outlook 98" Gini Courter, Annette Marquis. p. 186.

* cited by examiner

Primary Examiner—N. Le
Assistant Examiner—Walter Benson
(74) Attorney, Agent, or Firm—Kristofer E. Elbing (57) ABSTRACT

An electronic mail system includes an electronic mail utility with a message creation interface responsive to user input to create an electronic mail message. A reconsideration prompting module is operative to extract one or more intended information elements from the message created using the electronic mail utility and to present them to the user in a display area. The reconsideration prompting module includes a reconsideration prompting control responsive to user input to confirm reconsideration of the meaning of intended information elements from the created message before sending the message. A network interface is operatively connected to a network and responsive to messages approved by the reconsideration prompting module.

3 Claims, 9 Drawing Sheets

ELECTRONIC MAIL SYSTEM

FIELD OF THE INVENTION

This invention relates to electronic mail systems, including electronic mail systems that are designed to reduce the incidence of errors in transmitting electronic mail.

BACKGROUND OF THE INVENTION

Electronic mail ("e-mail") is now extensively used as a business and professional tool. Although it was at first largely used in research and engineering circles to share technical information, as the reach of the Internet has expanded, so too have the uses for e-mail. Business people now commonly use it to negotiate and even enter into business transactions. Physicians, attorneys, and accountants, use it to communicate with their patients or clients. And government officials use it to communicate in their official capacities.

The use of e-mail for such tasks is not without risk. Ill-considered criticisms sent by e-mail within an organization or without (sometimes known as "flaming") can be disruptive or damaging to the organization. Misdirected messages or messages that lack essential components (such as cc's or file attachments) can create inefficiencies, either because multiple messages have to be sent to accomplish their original purpose or because recipients are subjected to redundant or unnecessary messages. Even worse, organizations may be subject to lawsuits by recipients alleging that they have been harassed, libeled, or discriminated against by the contents of e-mail messages sent by its employees. Carelessly drafted e-mail messages may create unintended contractual liabilities or bad will for an organization. Misrouted or misaddressed messages can divulge confidential business information, and may result in the permanent loss of trade secrets or other intellectual property rights.

As a result, a large number of corporate and governmental organizations have implemented e-mail use policies for their employees, and many of these organizations have also set up some type of employee e-mail monitoring procedure. But because of the amount of effort required, such procedures generally fall short of a detailed review of all messages sent by employees. Instead, an employee's e-mail is often only carefully evaluated once there is some indication that his or her communications present a risk or have already created a problem.

Systems have also been proposed that detect individual words or phrases without human intervention. One of these systems filters e-mail messages to detect sexually explicit or otherwise objectionable language patterns, and returns any messages that include such patterns to the user's in-box. But while these systems may be able to detect crude language usage or other potentially undesirable keyword patterns, language that is harassing or insulting, or that breaches an organization's confidentiality or creates other business risks, can be quite subtle.

Moreover, both human and automated pattern monitoring can be completely ineffective when applied to individual messages. This is because any particular message may only be viewed as objectionable or otherwise problematic in view of the context of other communications. And these other communications are often not available to the software, or even a human reviewer. The use of e-mail by individuals or by employees of an organization therefore can still pose a substantial risk.

SUMMARY OF THE INVENTION

In one general aspect, the invention features an electronic mail system that includes an electronic mail utility with a message creation interface responsive to user input to create an electronic mail message. The system also includes a reconsideration prompting module that is operative to extract one or more intended information elements from the message and to present them to the user in a display area. A reconsideration prompting control allows the user to confirm reconsideration of the meaning of the intended information elements from the message before sending it, and a network interface is responsive to approved messages.

In preferred embodiments, the reconsideration module can be operative to extract one or more addressee identifiers from the message and to present them to the user, with the prompting control being operative to confirm reconsideration of the user's selection of the addressees. The reconsideration module can be operative to extract one or more carbon copy recipient identifiers from the message and to present them to the user, with the prompting control being operative to confirm reconsideration of the user's selection of the carbon copy recipients. The reconsideration module can be operative to extract one or more blind copy recipient identifiers from the message and to present them to the user, with the prompting control being operative to confirm reconsideration of the user's selection of the blind copy recipients. The reconsideration module can be operative to extract one or more attachment identifiers from the message and to present them to the user, with the prompting control being operative to confirm reconsideration of the user's selection of attachments corresponding to the attachment identifiers. The reconsideration module can be operative to present at least a part of the content of the attachments corresponding to the attachment identifiers. The reconsideration module can be operative to extract one or more potentially sensitive strings from the message and present them to the user, with the prompting control being operative to confirm reconsideration of the user's selection of the potentially sensitive strings. The reconsideration module can be operative to select prompting actions based on an attribute of one or more recipient identifiers for the message. The reconsideration module can be operative to select prompting actions based on an attribute of one or more attachments to the message. The reconsideration module can be operative to select prompting actions based on a mismatch between one or more attributes of one or more of the attachments with one or more attributes of one or more recipient identifiers for the message. The reconsideration module can be operative to select prompting actions based on intended content in the message. The reconsideration module can be operative to select prompting actions based on the detection of potentially sensitive content in the message. The reconsideration module can be operative to select prompting actions based on a mismatch between attributes of one or more of the attachments with content in the message. The reconsideration module can be operative to select prompting actions based on a mismatch between attributes of one or more intended recipient identifiers for the message with content in the message. The reconsideration module can include a plurality of prompting controls each responsive to user input to confirm reconsideration of the meaning of one or more of the intended information elements from the message. The reconsideration module can be operative to delay reconsideration for a predetermined period of time. The reconsideration module can be operative to delay reconsideration for a user-selected period of time. The mail utility and the reconsideration module can be separate programs, with the reconsideration module being an application extension operative to interact with the mail utility. The reconsideration module can be responsive to a user profile to determine its prompting behavior. The system can include an administrative module operative to define different prompting behavior for the reconsideration module for different users. The administrative module can include a group control operative to select prompting behavior for the reconsideration module for groups of users. The electronic mail utility can include an addressing control responsive to user input to associate an address with the message and a completion control responsive to user input to indicate completion of the message, with the prompting module being responsive to the completion control.

In another general aspect, the invention features an electronic mailing method that includes steps of creating a message in response to user input, presenting one or more intended information elements to the user from the message created in the step of creating, and presenting a prompting control to the user to allow the user to confirm reconsideration of the meaning of the one or more intended information elements.

In a further general aspect, the invention features an electronic mail system that includes means for creating a message in response to user input, means for presenting one or more intended information elements to the user from the message created in the step of creating, and control means for confirming reconsideration of the meaning of the one or more intended information elements.

In another general aspect, the invention features an electronic mail system that includes an electronic mail utility including a message creation interface responsive to user input to create an electronic mail message. The system also includes a protection module responsive to the electronic mail utility and operative to interpret contents of one or more predetermined information fields from the message created using the electronic mail utility and to selectively prevent otherwise proper transmission of the message based on information in the information fields. In preferred embodiments the predetermined information fields can include both a recipient identifier and an attachment identifier.

In a further general aspect, the invention features an electronic mail system that includes an electronic mail utility with a message creation interface responsive to user input to create an electronic mail message. The system also includes a reconsideration prompting module including a reconsideration prompting control responsive to user input to confirm reconsideration before sending the message and an administrative module operative to define different prompting behavior for the reconsideration module for different users, with the prompting module being responsive to definitions created using the administrative module. A network interface is operatively connected to a network and responsive to messages approved by the reconsideration prompting module.

In another general aspect, the invention features an electronic mail system that includes an electronic mail utility including a message creation interface responsive to user input to create an electronic mail message and a user-programmable delay module having an initiation input responsive to a completion control for the electronic mail utility, a duration control responsive to user input, and a completion output. The system also comprises a reconsideration prompting module responsive to the completion output of the delay module and including a reconsideration prompting control responsive to user input to confirm reconsideration before sending the message. A network interface is operatively connected to a network and responsive to messages approved by the reconsideration prompting module.

In preferred embodiments, the user-programmable delay module can be programmable by an administrative user to mandate a delay of a predetermined minimum length. The user-programmable delay module may also be programmable by an end user.

In a further general aspect, the invention features an electronic mail system application extension that includes an interface to an electronic mail utility including a message creation interface responsive to user input to create an electronic mail message. The system also includes a reconsideration prompting module responsive to the electronic mail utility via the interface and responsive to user input, with the prompting module being operative to extract one or more intended information elements from the message created using the electronic mail utility and to present them to the user in a display area and including a reconsideration prompting control responsive to user input to confirm reconsideration of the meaning of the intended information elements from the message before sending the message.

In another general aspect, the invention features an electronic mail system application extension that includes an interface to an electronic mail utility including a message creation interface responsive to user input to create an electronic mail message. The system also includes a protection module responsive to the electronic mail utility via the interface and operative to interpret one or more predetermined information fields from the message created using the electronic mail utility and to selectively prevent otherwise proper transmission of the message based on information in the information fields.

In a further general aspect, the invention features an electronic mail system application extension that includes an interface to an electronic mail utility including a message creation interface responsive to user input to create an electronic mail message. The system also includes a user-programmable delay module having an initiation input responsive to a completion control for the electronic mail utility via the interface, a duration control responsive to user input, and a completion output. A reconsideration prompting module is responsive to the completion output of the delay module and includes a reconsideration prompting control responsive to user input to confirm reconsideration before sending the message.

In another general aspect, the invention features an electronic mail system application extension that includes an interface to an electronic mail utility including a message creation interface responsive to user input to create an electronic mail message. The system also includes a reconsideration prompting module responsive to the electronic mail utility via the interface and including a reconsideration prompting control responsive to user input to confirm reconsideration before sending the message. An administrative module is operative to define different prompting behavior for the reconsideration module for different users, with the prompting module being responsive to definitions created using the administrative module.

In a further general aspect, the invention features a machine-readable data memory comprising a prompting profile database that includes a plurality of prompting profiles that each include a plurality of reconsideration prompting option values for a particular mail system user. In preferred embodiments, values for the prompting options can include a disabled value, an enabled value, and a mandated value.

Systems according to the invention can permit an individual or an organization to set a prompt or series of prompts to require or permit the sender of an e-mail message to reconsider and confirm the correctness of, among other things, the persons to whom the message is addressed (including cc's and blind cc's), file attachments (including versions), potential spelling and grammar errors, and/or key words or phrases that might be viewed as sensitive by the recipient or by the sender's organization (whether obscene, offensive, abusive, insulting, confidential, privileged, sensitive or otherwise objectionable or problematic, all as may be customized by the user). Further, systems according to the invention can permit an individual or an organization to set a prompt or series of prompts to require or permit the sender of an e-mail message to reconsider and confirm the tone and content of the entire message, with or without a mandatory or optional delay, before it is sent.

Systems according to the invention are particularly advantageous in that they can efficiently and effectively permit an individual to monitor himself or herself and can protect an organization from employee e-mail risk. Such protection is particularly effective because it is based on the knowledge of the individual most able to correct most transmission errors-the sender of the message. Because he or she is generally most familiar with the context of a message, the sender can quickly recognize errors that human or automated review could not. For example, while the sender might quickly recognize an incorrect version of a proposed bid, such a task might be impossible for a reviewer who was unfamiliar with the bid negotiations. And even if this contextual information were accessible, the task of detecting the error would usually be more difficult for the reviewer than for the sender, who is already familiar with the information.

The protection offered by systems according to the invention can also be precisely tailored to a particular user or organization. Organization-wide profiles can define prompting attributes that correspond to the types of errors that are characteristic to specific organizational functions. Group profiles can allow users to be prompted for the types of errors that they are likely to make, based on their responsibilities and the sensitivity of the information they work with. And individual profiles can permit each particular user to be prompted for the types of errors that he or she is most likely to commit, based on, for example, the types and frequency errors they have committed in the past. Moreover, some or all of the elements in these profiles can be made mandatory, while others are left to be selected by individual users based on their own habits and risk assessments. By combining these different levels of customization and preference, an individual or organization can put in place a highly tailored system that achieves a maximum degree of protection from risk.

This high degree of protection is available with a relatively low impact on existing or planned e-mail systems. Because systems according to the invention can be installed as plug-ins for existing mail systems, they do not require retraining or the reinstallation of other plug-ins. And such systems are useable in combination with other forms of monitoring, allowing an organization to reap the benefits of both measures.

Systems according to the invention are also particularly beneficial in that they can detect the types of errors that are often associated with e-mail. Although some potential liability is the result of deliberate or wanton conduct by reckless, incompetent, or possibly criminal employees, a large number of serious errors fall into a few specific categories of human error or failure to give due consideration to the content of messages. These types of errors, which range from forgetting an attachment to sending a sensitive message to the wrong addressee, tend to result from e-mail's ease of use and generally informal usage—often without the review or editing process common to traditional methods of communication—and are often attributable to the most diligent employees. Nonetheless, they can have consequences ranging from merely inconvenient to devastating, and by detecting them, systems according to the invention can substantially improve efficiency and reduce the damage associated with ill-conceived or ill-considered e-mail messages.

DETAILED DESCRIPTION OF THE DRAWINGS

DETAILED DESCRIPTION OF AN ILLUSTRATIVE EMBODIMENT

Figure 1:
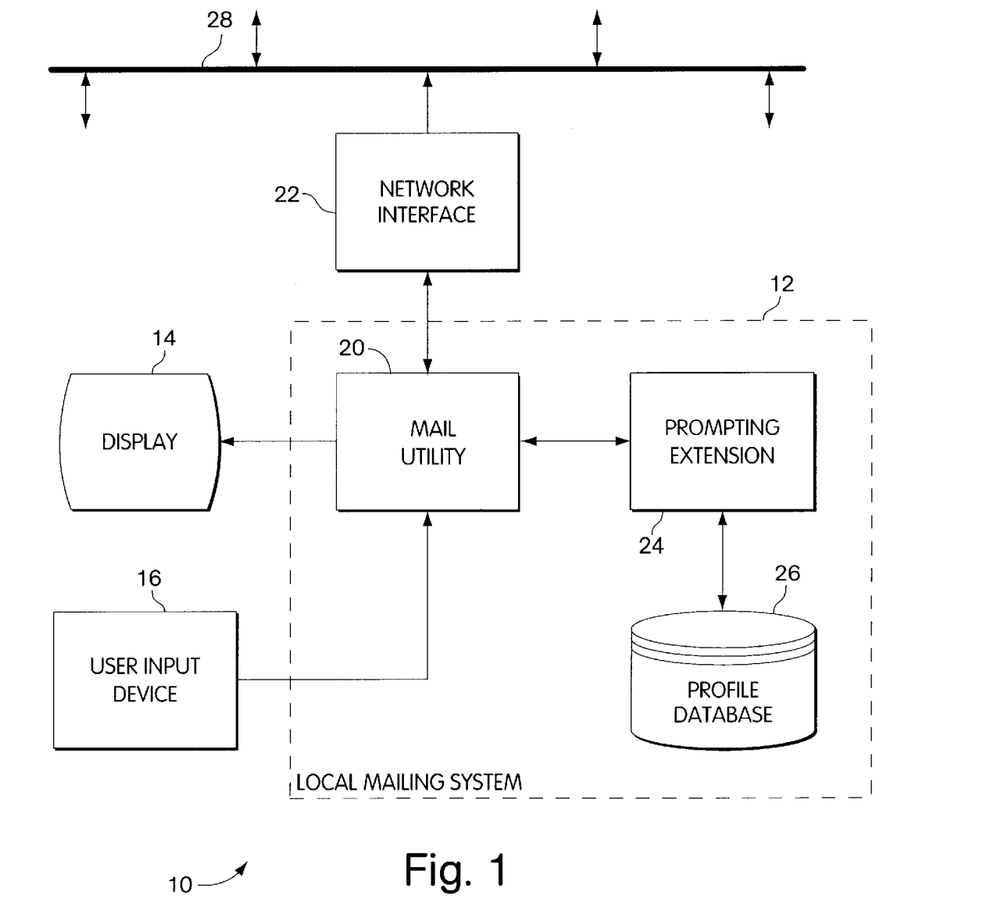
FIG. 1 is a block diagram of an illustrative electronic mail system according to the invention.

Referring to FIG. 1, a system according to the invention 10 includes a local mailing system 12, a display 14, and a user input device 16, such as a mouse or keyboard. The local mailing system can include a mail utility 20, a network interface 22, a prompting extension 24, and a profile database 26. The mail utility in this illustrative embodiment preferably includes an off-the-shelf mail application, such as Microsoft® Outlook, QUALCOMM® Eudora, or the University of Washington's PINE® and preferably includes a message creation interface. The network interface is a communication facility allowing the mail utility to communicate mail messages to a network 28, such as the Internet, either directly or indirectly. The local mailing system can be implemented using software running on one or more computers, such as a personal computer or a network of personal computers. These computers can run an off- the-shelf operating system, such as UNIX®, MAC-OS®, Linux® or Microsoft® Windows. One of ordinary skill would recognize, however, that numerous other implementations are also possible. The exact makeup of such implementations will depend on desired user interface and messaging features, the nature of the communications network used by the system, available technology, and a variety of other variables.

The prompting extension 24 is preferably an application extension that interacts with the mail utility 20 to provide additional mail-related features, and this interaction can take place through a formal interface known as an Application Programming Interface (API). Other implementations of the local mailing system are also possible, However, such as systems that include a single application combining the functions of the mail utility and prompting extension, or a systems that employ prompting extensions that interact with messages after they have left the mail utility. The profile database 26 is preferably included in one or more data storage areas, such as disk or integrated circuit storage areas, that are accessible to the prompting extension for the storage of profile information. The profile information can include a profile database that includes prompting profiles with values for each of a number of prompting options (e.g., enabled or mandated).

Figure 2:
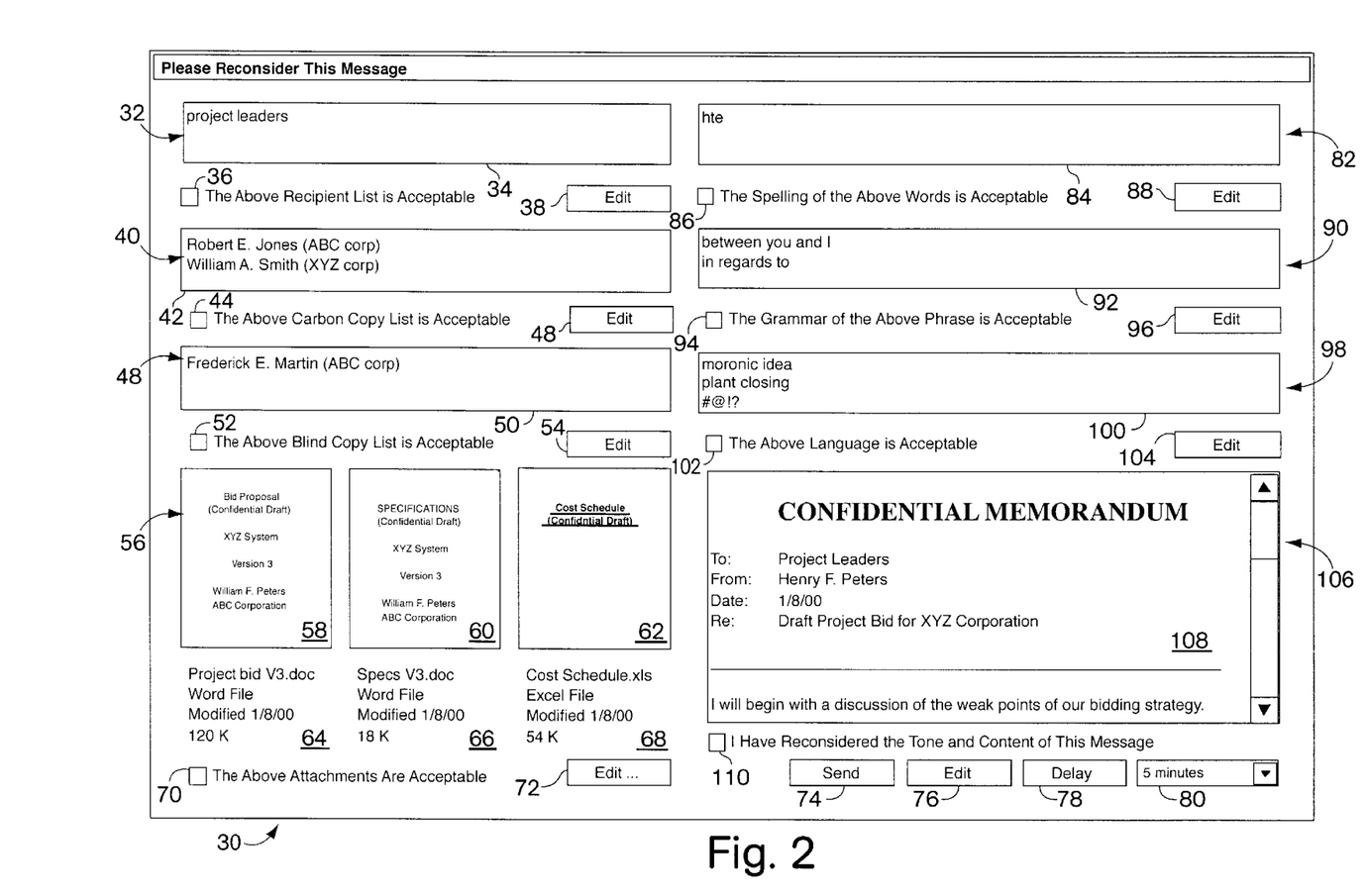
FIG. 2 is a screen view of a compound prompting dialog for the system of FIG. 1.

Referring to FIG. 2, the prompting extension 24 can present a reconsideration prompting dialog 30 to the user. The extension preferably presents the dialog to the user once he or she has indicated that he or she has finished preparing a message. For example, the prompting dialog can intercept the mail utility's "send" command and present the dialog before the mail utility can actually send the message.

The reconsideration dialog includes an addressee reconsideration area 32, which can be made up of an addressee display area 34, an acceptance check box 36, and an edit button 38. The reconsideration prompting dialog also includes a carbon copy reconsideration area 40, which can be made up of a carbon copy recipient display area 42, an acceptance check box 44, and an edit button 46. Similarly, the reconsideration prompting dialog includes a blind copy reconsideration area 48, which can be made up of a blind copy recipient display area 50, an acceptance check box 52, and an edit button 54.

The reconsideration prompting dialog 30 also includes an attachment reconsideration area 56, which can include one or more attachment viewing windows 58, 60, 62 associated with one or more attachment information display areas 64, 66, 68. A scroll control can be provided to view additional attachment viewing windows and information display areas if there is not enough space to display them in the attachment reconsideration area. The attachment reconsideration area can also include an acceptance check box 70 and an edit button 72. Further included in the reconsideration prompting dialog 30 are a send button 74, a message edit button 76, a delay button 78, and a delay control 80, which can take the form of drop-down list control.

The reconsideration prompting dialog 30 further includes spelling, grammar, and sensitive language reconsideration areas 82, 90, 98. These respectively include a misspelled word display area 84, a grammatically incorrect phrase display area 90, and a sensitive language display area 98. Each of these areas also includes an acceptance check box (86,94,102) and an edit button (88,96,104).

A message reconsideration area 106 is also included in the reconsideration prompting dialog 30. It includes a message editing window 108, which displays scroll bars as needed, and an acceptance check box 110. While in the embodiment shown, the prompts are organized around the different parts of a message, other arrangements are also possible. Prompting could instead be centered around types of risk, resulting in prompts such as "message reconsidered in light of trade secret considerations."

Figure 3:
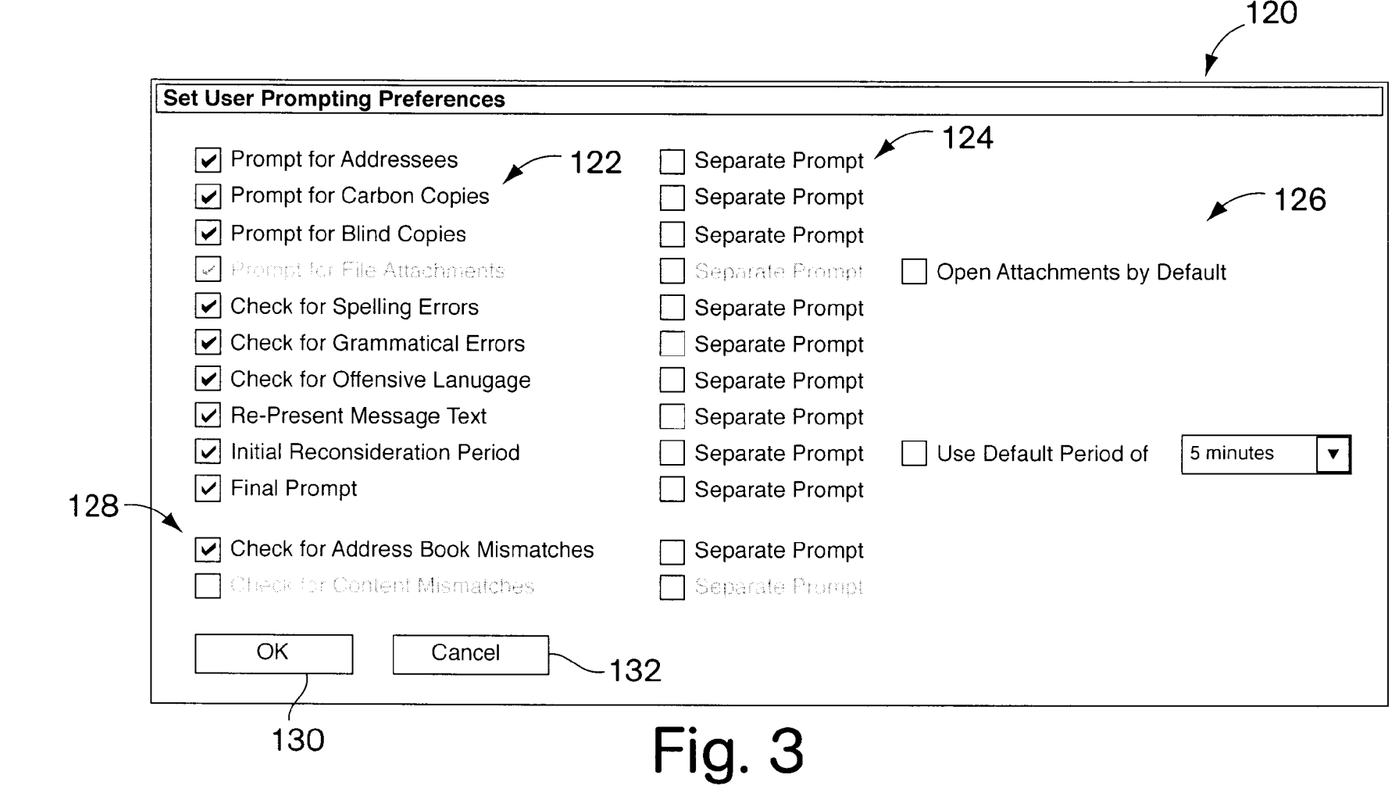
FIG. 3 is a screen view of a user preferences dialog for the system of FIG. 1.

Referring to FIG. 3, the reconsideration prompting can be customized using a user preferences dialog 120. This dialog is preferably accessed via a menu entry, which the plug-in can add to an existing menu within the mail utility. The user preferences dialog includes a number of prompting function controls, such as check boxes, which can be organized in three columns 122, 124, 126. The first column includes a set of prompting event controls. The second column includes a set of separate-prompting controls, which can each correspond to one of the prompting function controls. The third column includes a set of parameter controls that can each correspond to one of the prompting event boxes. The user preferences dialog also includes a set of additional function controls 128 that can also be divided into three columns. Further included is an acceptance button 130 and a cancel button 132. Function assignments for one embodiment are listed in table 1.

TABLE 1

| Prompting function | Parameter |
| --- | --- |
| Prompt for Addressees | |
| Prompt for Carbon Copies | |
| Prompt for Blind Copies | |
| Prompt for File Attachments | Open File Attachments by Default |
| Prompt for Spelling Errors | |
| Prompt for Grammatical Errors | |
| Prompt for Sensitive Language | |
| Represent Message Text | |
| Initial Reconsideration Period | Use Default Period/Define Period |
| Final Prompt | |
| Check for Address Book Mismatches | |
| Check for Content Mismatches | |

Figure 4:
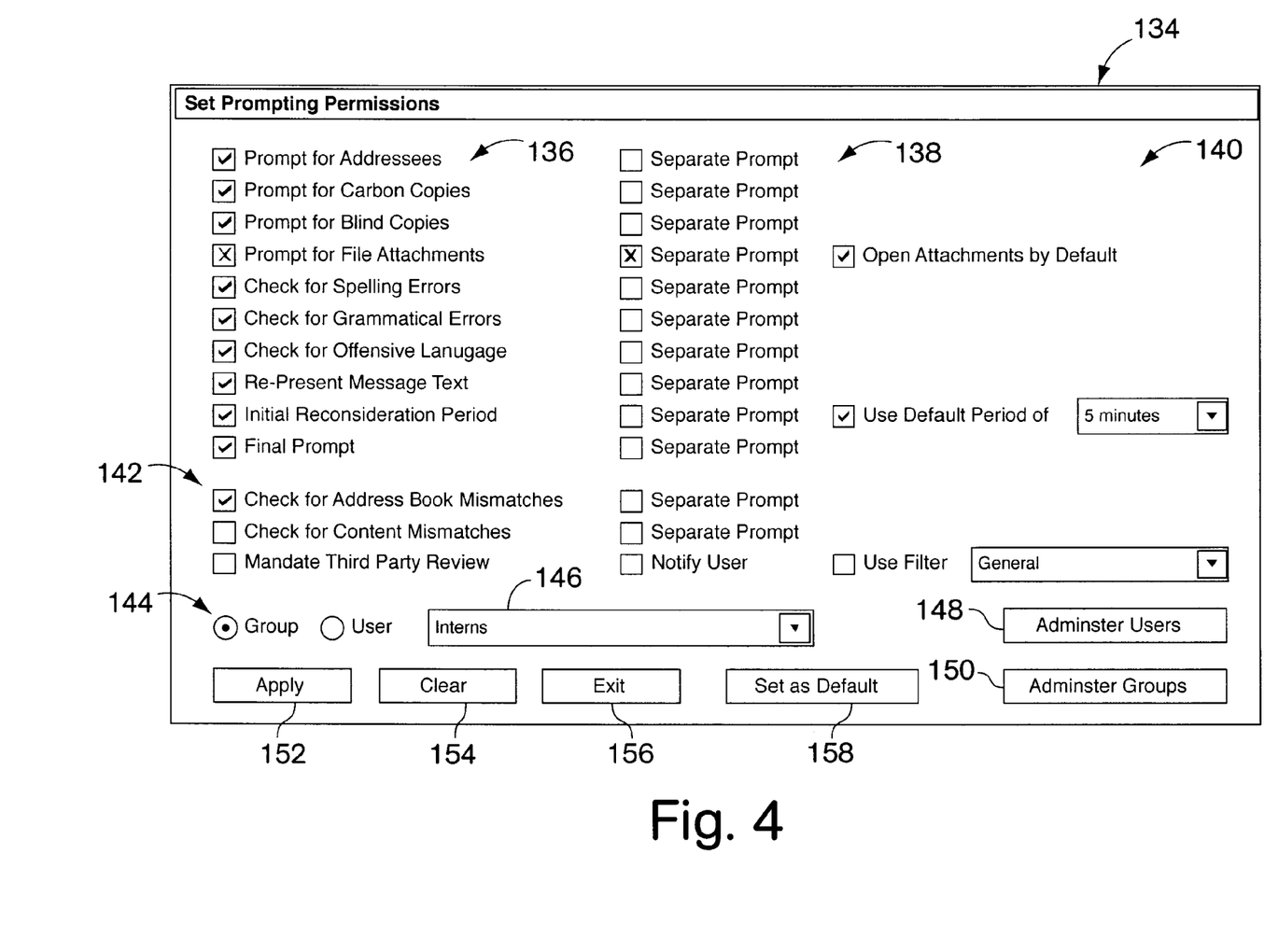
FIG. 4 is a screen view of a system administration dialog for the system of FIG. 1.

Referring to FIG. 4, the preferences available to each user can be customized using a system administration dialog 134. This dialog also includes a number of controls that can be organized in three columns 136, 138, 140. The first column includes a set of prompting event controls. The second column includes a set of separate-prompting controls that can each correspond to one of the prompting function controls. The third column includes a set of parameter controls that can each correspond to one of the prompting event boxes. The system administration dialog also includes a set of additional function controls 142 that can also be divided into three columns. In one embodiment, the function assignments for the three columns are the same as those for the user preferences dialog 120, but the additional function controls are different. The system administration dialog also includes a group/user profile control 144 and a group/user selection control 146, as well as a user administration button 148 and a group administration button 150. The system administration dialog further includes an apply button 152, a clear button 154, an exit button 156, and a set as default button 158.

Although the system described above is implemented using a particular combination of hardware and software, other implementations are also possible. System elements can be built using special-purpose hardware, software running on a general-purpose processor, or a combination of both. The evolving use of technology may result in different systems for sending and receiving messages than the desktop or network systems referred to in this embodiment, and systems according to the invention can be adapted for use accordingly. In addition, while the system can be broken into the series of modules, functional groupings, and user interface elements shown, one of ordinary skill in the art would recognize that in many instances it is also possible to combine them and/or split them to achieve a different breakdown or appearance.

Figure 5:
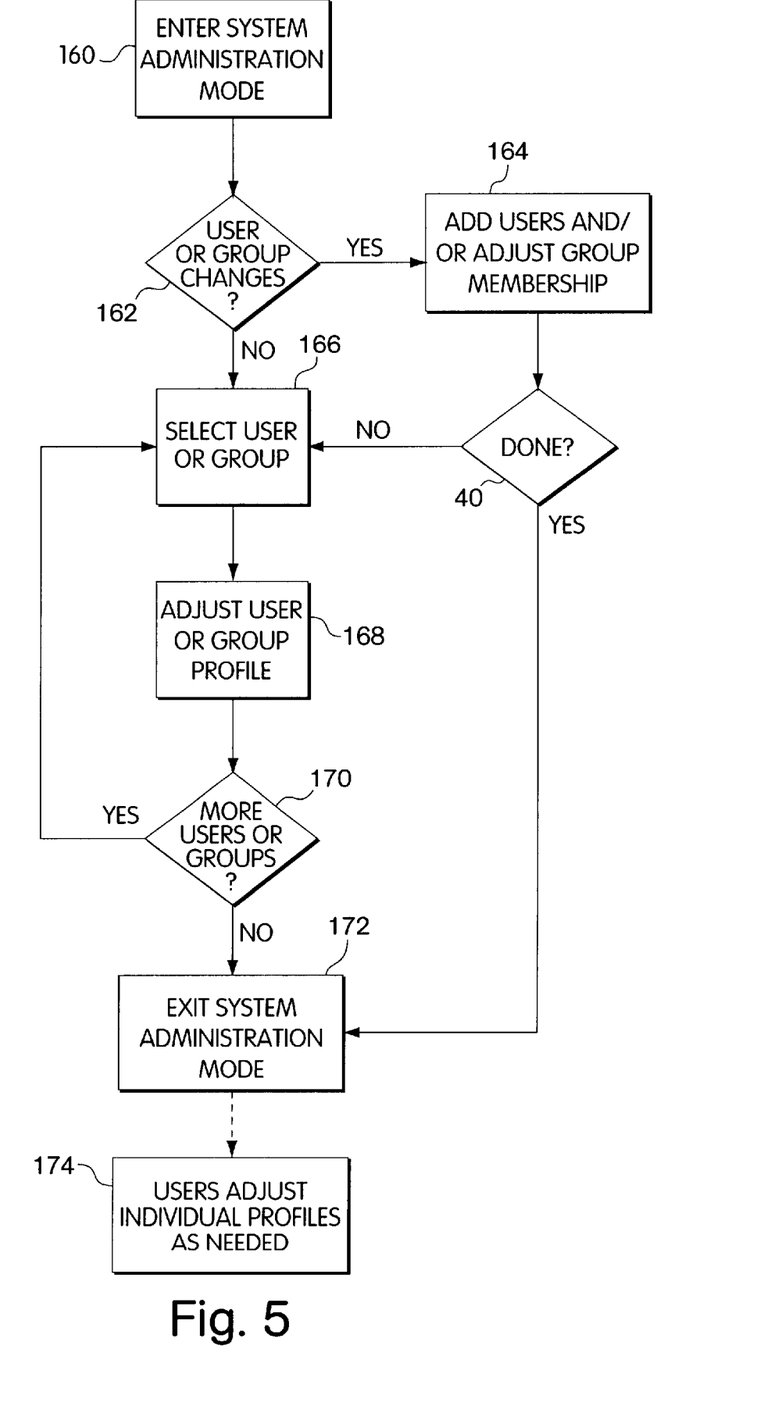
FIG. 5 is a flowchart generally illustrating profile definition operations of the system of FIG. 1.

Referring to FIGS. 3–5, after installation on the host computer system, operation of the electronic mail system 10 begins with a system set-up phase. An administrator having the appropriate privileges begins this set-up phase by entering the system's system administration mode (step 160). In one embodiment, the administrator accesses this system administration mode by actuating a stand-alone administration program installed on his or her computer. This program first prompts the user for his or her password and then presents the system administration dialog 134.

If the administrator wants to add or subtract users from the mail system, he or she can actuate the user administration button 148. If the administrator wants to create system groups or change the membership of system groups, he or she can actuate the group administration button 150 (step 162). In one embodiment, these buttons invoke user and group membership functions for the mail utility 20, allowing the administrator to add or remove users from the overall mail system and to add or subtract users from the mail utility's preexisting mail distribution groups (step 164). If preexisting distribution groupings do not map well to desired profile groups, the user can also use the mail utility's group controls to create additional new groups to be used for profiling purposes.

Note that the system is usable without any defined groups, and that the system can also be used as a stand-alone product for individual computer users. Such a stand-alone system can allow an organization to outfit consultants or other individuals outside of the corporate network with the same types of safeguards used within the organization. Stand-alone systems can also be used by unaffiliated individuals or groups of individuals in organizations where computers are not networked. Such systems preferably include password-protected administration features that allow administrative users to enable or mandate features for the ordinary user of the computer.

With a preexisting or modified set of users and groups (if any) in place, the administrator can set up profiles. He or she begins the creation of each profile by first specifying whether it is to be for a user or a group, using the group/user profile control 144. He or she can then select the user for which the profile is to be defined, using the group/user selection control 146 (step 166). This control presents the user with a list of users or groups, which can be obtained from a user database maintained by the mail utility 20.

The administrator is now ready to define the elements of a profile for a group or user using the system administration dialog 134. The administrator can begin this task by enabling and mandating prompts for the user using the prompting controls in the first column 136 of the dialog. In one embodiment, single-clicking a check box for a particular prompt enables the prompt and leaves a check mark in the check box. Double-clicking the check box mandates the prompt and leaves a cross in the check box. In the example shown, the administrator has mandated prompting for file attachments and enabled all other prompting.

The administrator can also enable or mandate separate prompting for each prompting control using the separate-prompting controls in the second column 138 of the system administration dialog 134. In one embodiment, single-clicking a check box for a particular prompt enables separate prompting for a prompting function and leaves a check mark in the check box. Double-clicking the check box mandates separate prompting for the function and leaves a cross in the check box. In the example shown, the user has mandated separate prompting for file attachments and disabled all other separate prompting.

Some of the prompting functions also have additional parameters that the administrator can select. For example, the administrator can select whether to allow or require the system to present a file attachment prompting dialog with file attachments open by default. The administrator can also enable or mandate a default minimum reconsideration period, beginning from the completion of the message, and define its length. If this period is made mandatory, the user will not be able to send any message before the expiration of the reconsideration period.

The administrator can use the additional function controls 142 in the system administration dialog 134 to define additional system functions. These can include content-based prompting operations, third party review functions, and/or other functions. In the embodiment shown, the user can select two types of content-based prompting operations, an address book mismatch function and a content mismatch function.

The address book mismatch function compares attributes of recipients with each other and/or with attributes of attachments. For example, the plug-in can retrieve client/matter codes for all types of addressees from the mail utility's address database and retrieve client/matter codes for all attachments from document profile information stored in the document or in a document management system database. If all of the client/matter codes for a message do not match, the user is prompted to reconsider mailing the message.

The content mismatch function compares content in the message and/or attachments with content in an address database and/or a document database. For example, the plug-in can search the mail program's contact database for references to the names of contacts in the body of the message that have different client/matter attributes than do the addressees of the message. The plug-in can also search for words used in the message that are not used in any of the documents associated with the client/matter attributes for the addressees of the message. If a substantial number of these words are not found, or if these words are instead found in documents for other clients and/or matters, the user can be prompted to reconsider.

This type of matching is preferably restricted to a particular set of proper nouns or statistically rare words, which can be system-dependant. For example, detecting in the body of a message a surname that is frequently used in the documents of one client, but never used in those of a client to which the message is addressed, may indicate that the message is misaddressed. To achieve the matching, the system can use one or more dictionaries, which can be dedicated to the prompting extension or form part of the mail utility. The dictionary and prompting sensitivity are preferably customizable.

The content-based prompting functions can also employ adverse and sensitive attributes to make more precise determinations. In systems equipped with this feature, addressees can be assigned an adverse property, while documents can be assigned a sensitive attribute. The system can then check for these attributes before sending a message. For example, a seller's system might designate all buyers as adverse parties, and designate draft documents, but not price lists, as sensitive. A content-based prompting feature configured in this way would prompt a user to reconsider sending a draft document to a buyer, but would not prompt him or her to reconsider sending a price list to the same buyer.

The content-based functions can also be enabled to prompt the user during preparation of the message. While other prompting functions can also be enabled during editing, the information conveyed by the content-based functions typically does not require a reconsideration delay.

The third party review function allows the administrator to require that all mail messages sent by a particular user be routed to the in-box of a reviewer or to an automated review system. In one embodiment the administrator can mandate or disable this function, but cannot enable it. He or she can choose whether the user is notified of the review. Where review is automated, a parameter control can be provided to allow the administrator to determine the type of review or filter to be used for a user or group of users.

When the administrator has finished specifying a profile for a user or group, he or she can save it by actuating the apply button 152 (step 168). The user can also reset the newly created profile to the system default by actuating the clear button 154, or define the newly created profile as the system default profile by actuating the set as default button 158. If the administrator needs to edit further profiles (step 170), he or she can select another user or group and edit their profiles in the manner described above. When the administrator has finished defining profiles, he or she can actuate the exit button 156 and exit the system administration program (step 172).

Individuals can also adjust their own profiles, to the extent permitted by the administrator, using the user preferences dialog 120 (step 174). This dialog allows the user to select or deselect prompting functions that are enabled but not mandated, and to choose whether particular prompts are to be presented separately or in a group dialog if such behavior is enabled but not mandated. In one embodiment, mandated or disabled functions are ghosted in the user preferences dialog, and no controls relating to the third party review function are available to the user.

Referring to FIGS. 2–6, after initial set up, the system will prompt users in accordance with their profiles. The process begins with a user preparing a message to be sent, using, for example, the mail editing functions of the mail utility 20. Once the user is satisfied with the contents and addressing of the message, he or she can actuate a control indicating that he or she has finished editing the message and is ready to send it. This control can take the form of a send button or a close icon within a message window. The user may also create the message in other ways, however, such as by selecting a displayed document to be sent in a web browser, or by dragging a document onto an active control area. In such cases the send command may be implicit in the creation of the message.

Figure 6:
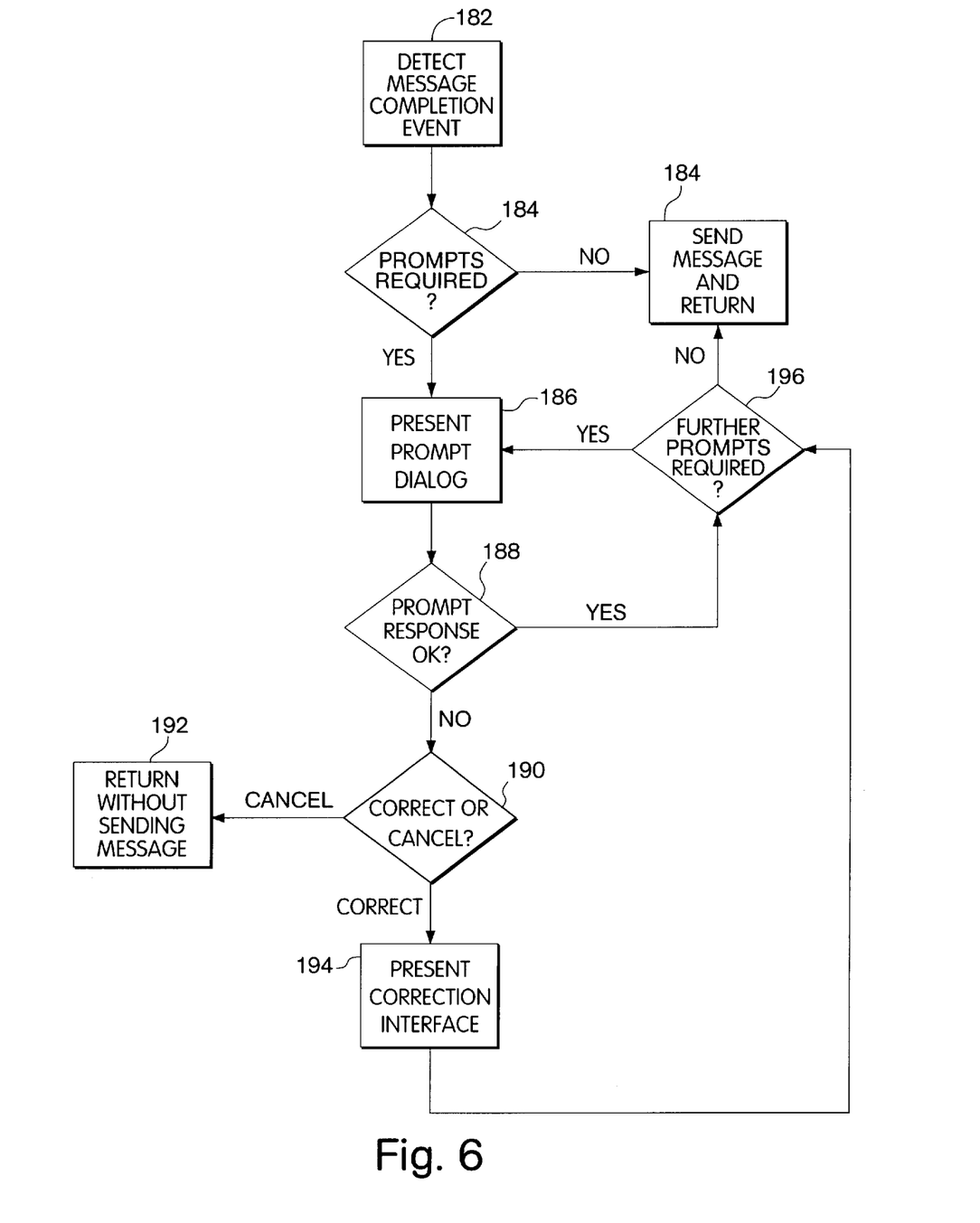
FIG. 6 is a flowchart generally illustrating the prompting operations for the system of FIG. 1.

The detection of the message completion event causes the system to initiate its prompting operations (step 180). If all prompting is disabled for the user, the system simply sends the message and returns control to the mail utility (steps 182, 184). If any of the prompting functions are enabled, however, the system assembles a prompting dialog, and presents it to the user (step 186).

The system then evaluates the user's response to the dialog to determine whether he or she has made an acceptable response, such as by clicking on an OK button, whether he or she has actuated a correct-type or cancel-type control (steps 188, 190). If the user actuates a cancel-type button, the message will not be sent, and the user will be returned to the program he or she was using before the prompt occurred (e.g., the mail utility) (step 192). If the user actuates a correct-type button, such as an edit button or an open button, the user will be presented with an appropriate interface to perform the correction, such as an editing window (194).

After completion of the prompting function carried out by a prompting dialog, the system determines from the user's profile whether further prompts remain (step 196). If no further prompts remain, the system sends the message and returns control to the mail utility (step 184). If further prompts remain, the system repeats the prompting process until either the user cancels, or there are no more prompting dialogs to be presented.

Referring to FIGS. 2–3 and 7–18, the prompting sequence is defined by the user's profile. If no separate prompt controls are selected, all prompting functions will be presented in a single dialog 30 (see FIG. 2). If all of the separate prompt controls are selected, the prompting fuinctions will be presented in separate dialogs 200, 202, 204, 206, 208, 210, 212, 214, 216, 218, 220, 222 (see FIGS. 7–18). If some of the prompt controls are actuated and others are not, the system will assemble a series of dialogs that each present one or more functions, with those functions selected to be presented separately each being presented in a dialog by themselves. The prompting order can be fixed, programmable, or designed to minimize the number of dialogs presented to the user.

Figure 7:
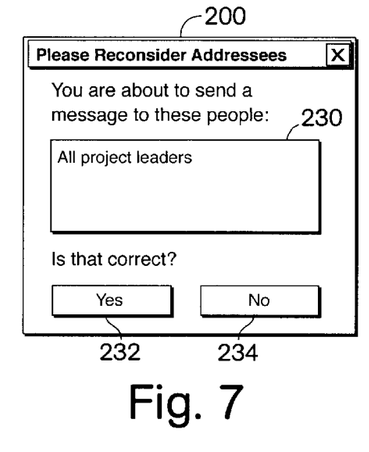
FIG. 7 is a screen view of an addressee reconsideration prompting dialog for the system of FIG. 1.

Referring to FIG. 7, a separate addressee reconsideration prompting dialog 200 includes an addressee list area 230, and yes and no buttons 232, 234. This type of dialog presents the addressees specified in the message and requests that the user reconsider including them. Prompting the user to reconsider addressees can be beneficial because accidental misaddressing of messages is relatively common and can have serious consequences. For example, some mail programs allow the user to have more than one authoring window open at a time, making it easy to type text intended for one addressee into the other message. Many mail programs also allow the user to create short and potentially confusing aliases for addressees. For this reason, it is preferable to present at least the full addressee name or official distribution list name to the user in the prompting dialog.

In the addressee reconsideration prompting dialog 200, pressing the yes button causes the system to present the next prompting dialog, if there is one. Pressing the no button returns the user to the program he or she was previously using (e.g., the mail utility). This and other prompting dialogs can also include an edit button, which can cause system to present an editing interface that will allow the user to make changes to at least the aspect of the message that is the subject of the current prompting dialog.

Figure 8:
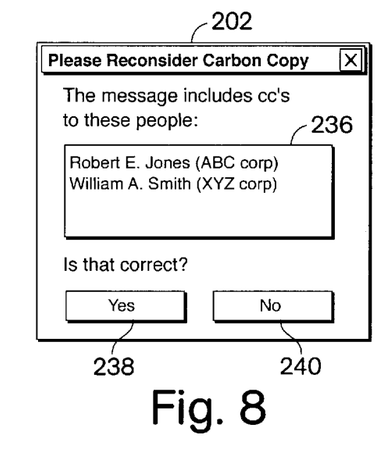
FIG. 8 is a screen view of a carbon copy reconsideration prompting dialog for the system of FIG. 1.

Referring to FIG. 8, a separate carbon copy reconsideration prompting dialog 202 includes a carbon copy addressee list area 236, and yes and no buttons 238, 240. This type of dialog presents the carbon copy addressees from the message and requests that the user reconsider including them. Like prompting the user to reconsider addressees, prompting to the user to reconsider carbon copy addressees can be beneficial because such accidental misaddressing of messages is relatively common and can have serious consequences. For example, many mail programs allow the user to respond to "all," which can add names to the user's list of carbon copy recipients, and these recipients may go unnoticed.

Figure 9:
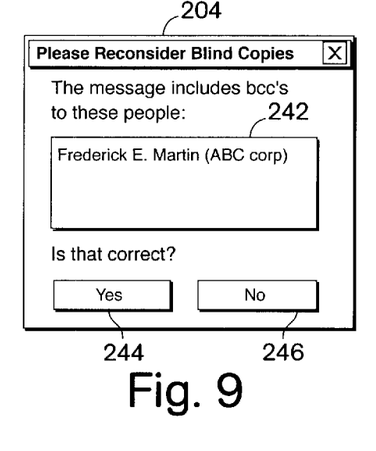
FIG. 9 is a screen view of a blind copy reconsideration prompting dialog for the system of FIG. 1.

Referring to FIG. 9, a separate blind copy reconsideration prompting dialog 204 includes a blind copy addressee list area 242, and yes and no buttons 244, 246. This type of dialog presents the blind copy addressees from the message and requests that the user reconsider including them. Like prompting the user to reconsider addressees and carbon copy addressees, prompting to the user to reconsider blind copy addressees can be beneficial because such accidental misaddressing of messages can have serious consequences, and is relatively common. For example, many mail programs allow the user to reuse messages to create new ones. But blind copies are often only appropriate for an initial communication, such as to indicate that a project has begun. By separately prompting the user for blind copies, the system can prevent the potentially harmful accidental reuse of the mail function's blind copy feature.

Figure 10:
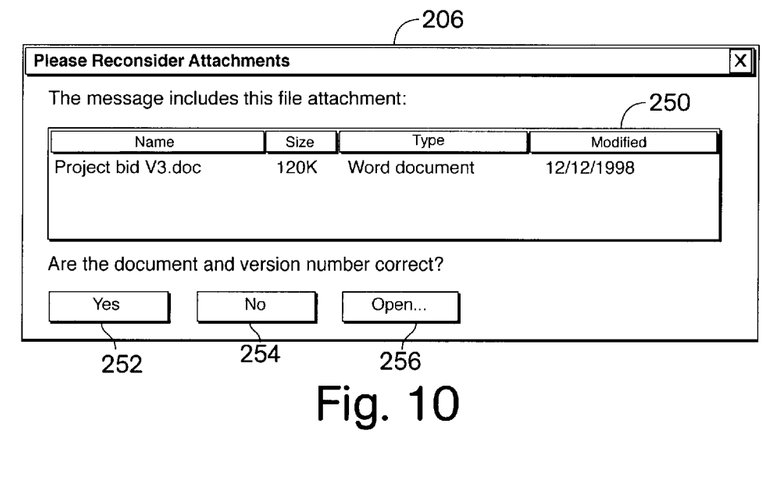
FIG. 10 is a screen view of an attachment reconsideration prompting dialog for the system of FIG. 1.

Referring to FIG. 10, a separate attachment reconsideration prompting dialog 206 includes an attachment list area 250, and yes, no, and open buttons 252, 254, 256. This type of dialog presents the names of the message attachments and requests that the user reconsider including them. Prompting the user to reconsider his or her attachments to a message can be beneficial because sending an attachment to the wrong addressee can have serious consequences. Such errors are common, however, because attachment icons can be overlooked, versions numbers can be confused, or attachments can be left on messages from earlier transactions.

Note that in many instances, the document title may also be insufficiently descriptive of the contents of the attachment, such as may be the case in a company that uses document numbers instead of descriptive document names. For this reason, the attachment dialog can also include an optional attachment previewing function. As shown in FIG. 2, the attachment previewing function can provide one or more attachment viewing windows that display the contents of the attachment. One or more attachment information display areas can also be associated with each attachment. These areas display information about the attachment, such as its name, creation date, modification date, and size. A scroll control can be provided to view additional attachment viewing windows and information display areas if there is not enough space to display them in the attachment reconsideration prompting dialog. Scroll controls can also be provided in the individual attachment viewing areas to allow the user to navigate within the attachments.

Figure 11:
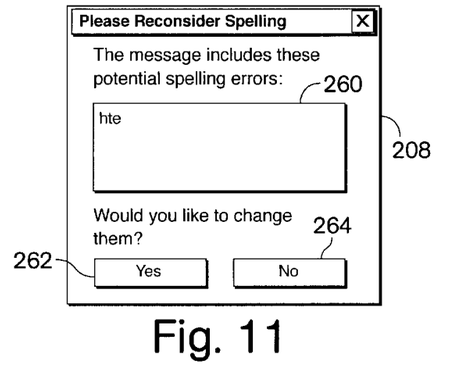
FIG. 11 is a screen view of a spelling reconsideration prompting dialog for the system of FIG. ;1
Figure 12:
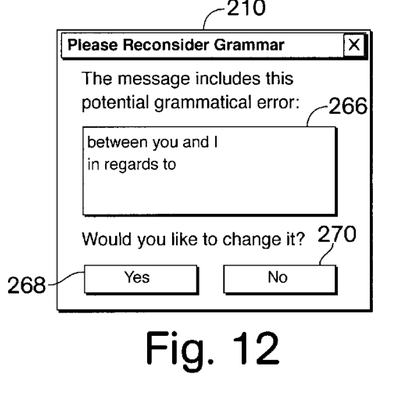
FIG. 12 is a screen view of a grammar reconsideration prompting dialog for the system of FIG. 1.

Referring to FIGS. 11 and 12, a separate spelling reconsideration prompting dialog 208 includes a spelling error list area 260, and yes and no buttons 262, 264. This type of dialog presents the results of a conventional spelling check to the user and prompts him or her to reconsider the spelling of misspelled words. This operation is different from other prompting dialogs presented by the system, in that the user is not prompted to reconsider the meaning of elements of his or her message, but simply alerted to the manner in which information is expressed. A separate grammar reconsideration prompting dialog 210 similarly includes a grammatical error list area 266, and yes and no buttons 268, 270. This type of dialog presents the results of a conventional grammar check to the user and prompts him or her to reconsider one or more grammatical constructions.

Figure 13:
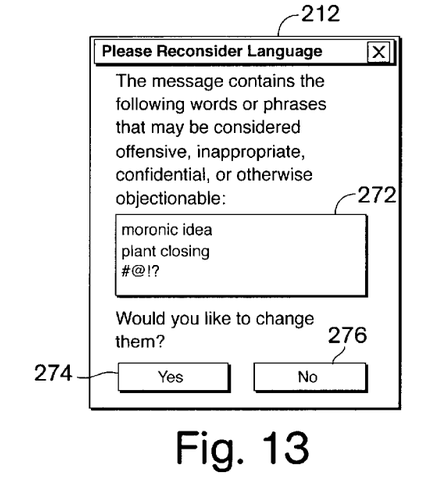
FIG. 13 is a screen view of a sensitive language reconsideration prompting dialog for the system FIG. 1.
Figure 14:
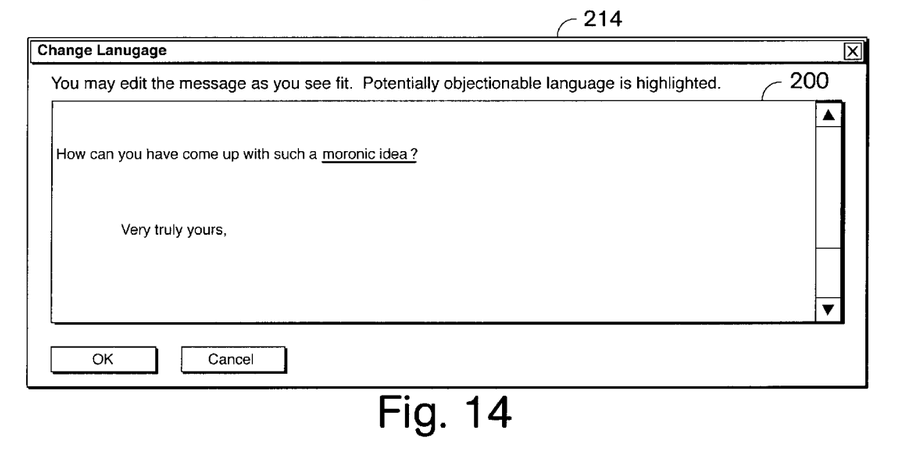
FIG. 14 is a screen view of a message editing dialog for sensitive language for the system of FIG. 1.

Referring to FIGS. 13 and 14, a separate sensitive language reconsideration prompting dialog 208 includes a sensitive language list area 272, and yes and no buttons 274, 276. This type of dialog presents potentially sensitive language detected by a filter to the user and requests that the user reconsider this language. If the user indicates that he or she would like to change the language, he or she can view the text in a separate message editing dialog 214 that highlights the sensitive language.

Sensitive language filtering can be performed by the prompting extension or by a third party program, and can even take place if no sensitive language prompting is enabled. Results from the filtering can then be feed back to the administrator to allow him or her to evaluate whether the user's profile should be changed. If an individual consistently uses obscene language, the administrator can mandate obscenity checking and/or make it a separate prompt.

The system can also monitor prompting results to allow the most effective prompting. Prompts where a particular user frequently reconsiders can then be mandated or made separate, and prompts where a user rarely reconsiders can be combined with other prompts or dropped. The adjustment of user profiles based on past filtering or prompting can be performed either manually or automatically.

Preferably, the types of language to be filtered can be customized to allow the system to filter any sensitive language on an organization-wide, group-wide, and/or user-specific basis. Thus in addition to obscene, insulting or other commonly offensive language, industry-specific or temporarily needed language can also be detected. For example, a medical organization might monitor for the names of narcotics and other DEA-regulated prescription drugs. A manufacturing company might monitor for the confidential names of products under development. And an organization might monitor for words such as "merger" during the confidential negotiation of a merger agreement. As used in this application, sensitive language can include any type of language that the organization or individual has an interest in monitoring, such as obscene, offensive, abusive, insulting, confidential, privileged, or otherwise objectionable or problematic materials.

Different departments in the same organization, such as legal and purchasing, may also choose to monitor for different types of language. And particular individuals may want to create monitoring rules that prevent them from making particular mistakes, such as to enforce a so-called "Chinese wall" in a group of a law firm. To maximize the efficacy of systems that use encryption, it is preferable to provide for secure automatic decryption of the mail messages for the purposes of monitoring.

Figure 15:
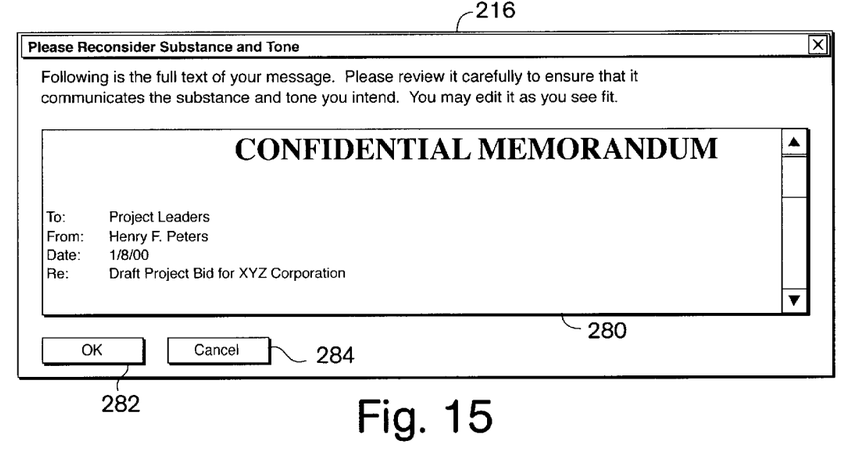
FIG. 15 is a screen view of a message reconsideration and editing dialog for the system of FIG. 1.

Referring to FIG. 15, the system can also present a message reconsideration and editing dialog to the user. This dialog includes a message editing window 280 and OK and cancel buttons 282, 284. This type of dialog re-presents the user's message to the user, preferably with at least some of the addresses prominently displayed, and requests that the user reconsider the message. This type of dialog is preferably presented after the expiration of a time delay, allowing the user time to reconsider the wisdom of sending the message in the form that it was originally drafted. Even if the user has not thought about the message at all during the reconsideration period, it has been observed that he or she will tend to notice mistakes in the message at the end of such a period.

Figure 16:
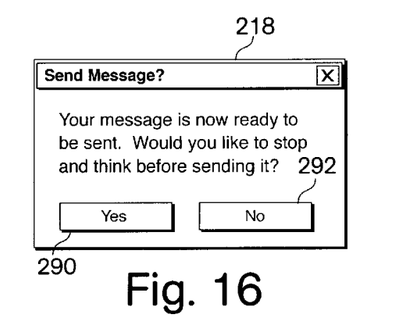
FIG. 16 is a screen view of a message send reconsideration dialog for the system of FIG. 1.

Referring to FIG. 16, a message send reconsideration dialog includes a yes button 290 and a no button 292. Pressing the no button allows the user to proceed to the next dialog, if any. Pressing the yes button causes the system to present a reconsideration interval dialog to the user.

Figure 17:
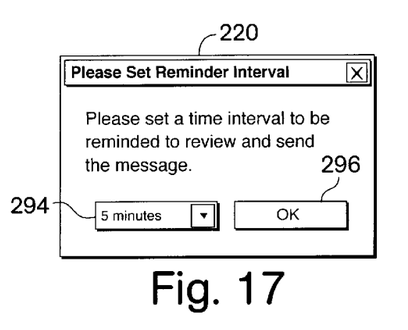
FIG. 17 is a screen view of a reconsideration interval dialog for the system of FIG. 1.

Referring to FIG. 17, the reconsideration interval dialog includes a duration selection control 294, such as a drop-down selection control, and an OK button 296. This dialog allows the user to select a delay period before he or she will be re-prompted to send the message. This re-prompting delay period is different from the initial delay period that can be enabled or mandated. In one embodiment, the re-prompting always includes only a message reconsideration and editing dialog instead of the user's usual set of prompting dialogs. The makeup of the re-prompting can also be programmable in a manner similar to that for the other prompting features, and the system may be programmed to prevent re-prompting for items, such as addressees and attachments, that have not changed.

Figure 18:
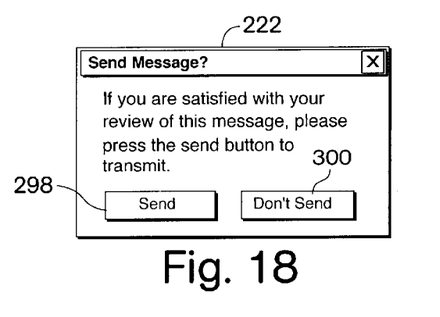
FIG. 18 is a screen view of final send prompting dialog for the system of FIG. 1.

Referring to FIG. 18, the system can also be programmed to present a final dialog. This dialog includes a send button and a don't send button 298, 300, and allows the user to reconsider sending the message one last time. In one embodiment, if the user selects the don't send button, he or she will be returned to the message to for editing and will have to repeat the whole prompting sequence to send the message.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto. In addition, the order of presentation of the claims should not be construed to limit the scope of any particular term in the claims.

What is claimed is:

1. An electronic mail system, comprising: an electronic mail utility including a message creation interface responsive to user input to create an electronic mail message, and a protection module responsive to the electronic mail utility and operative to interpret a relationship between contents of a plurality of predetermined information fields from the message created using the electronic mail utility and to selectively prevent otherwise proper transmission of the message based on the interpretation of the relationship between information in the information fields.

2. The apparatus of claim 1 wherein the predetermined information fields include both a recipient identifier and an attachment identifier.

3. An electronic mail system application extension, comprising: an interface to an electronic mail utility including a message creation interface responsive to user input to create an electronic mail message, and a protection module responsive to the electronic mail utility via the interface and operative to interpret a relationship between contents of a plurality of predetermined information fields from the message created using the electronic mail utility and to selectively prevent otherwise proper transmission of the message based on the interpretation of the relationship between information in the information fields.

\* \* \* \* \*